March 10, 1953 — H. C. GREEN — 2,630,693
CAMERA FLASH UNIT
Filed April 3, 1950

Henry C. Green
INVENTOR.

BY Clarence A. O'Brien
and Harvey B. Jacobson
Attorneys

Patented Mar. 10, 1953

2,630,693

UNITED STATES PATENT OFFICE 2,630,693

CAMERA FLASH UNIT

Henry C. Green, Fayetteville, Ark.

Application April 3, 1950, Serial No. 153,706

2 Claims. (Cl. 67—31)

This invention comprises novel and useful improvements in camera flash units, and particularly pertains to an adaptor device for converting the flash unit, which unit generally retains a power pack therein, to a flash unit which may be operated by a remotely positioned power rack.

Various important objects of this invention are to provide an adaptor device for a flash unit, which flash unit generally retains a power pack therein, to convert the flash unit to one which may be operated by a remotely positioned power pack, which adaptor device will permit the flash unit to be operated in its conventional manner; which adaptor device will permit the use of a power pack having a longer life than that power pack which could be positioned within the flash unit; and which adaptor unit is of simple construction, yet highly efficient for the purposes intended.

Various important features of this invention resides in the provision of a core which is detachably receivable in the casing of the flash unit, so as to be interchangeable with the power pack which would otherwise be positioned therein, which core has electrical contact terminals positioned thereon in such a manner as to electrically contact the points that a power pack positioned in the flash unit casing would otherwise contact, which core has a longitudinally extending bore therein with conductors extending through the bore to electrically connect the contact terminals to a remotely positioned battery.

These, together with various ancillary objects and features are attained by this device, a preferred embodiment of which has been illustrated by way of example only in the accompanying drawings, wherein.

Figure 2:
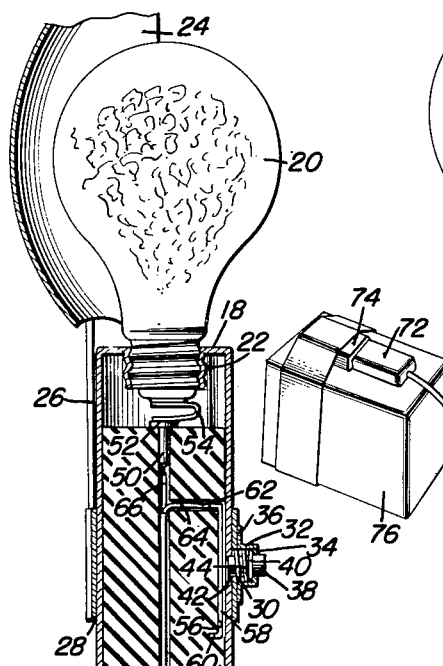
Figure 2 is a longitudinal sectional view of the flash unit attachment, showing the adaptor unit mounted therein.
Figure 1:
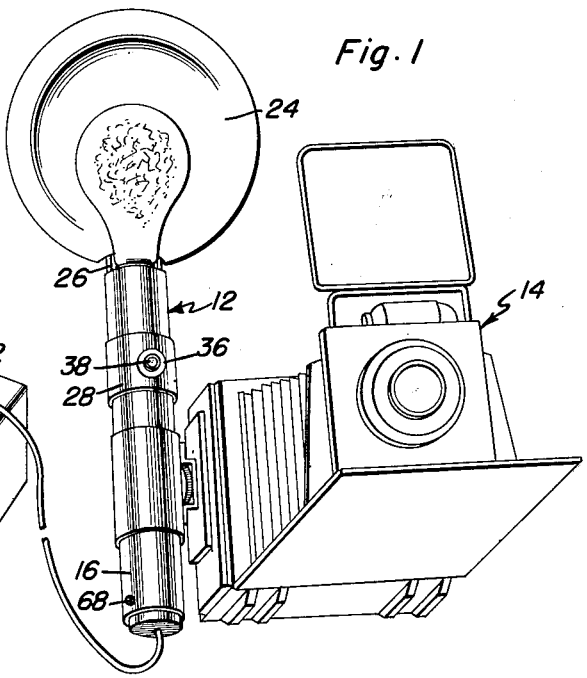
Figure 1 is a perspective elevational view of a camera having a flash unit attached thereto, with the adaptor device mounted in the flash unit, and electrically connected to a remotely positioned battery.
Figure 3:
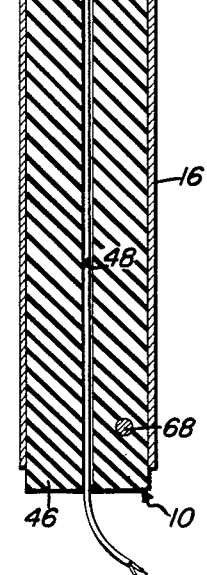
Figure 3 is a perspective elevational view of the adaptor device.

Referring now more specifically to the accompanying drawings wherein like numerals designate similar parts throughout the various views, it will be readily seen that there is provided an adaptor unit indicated generally by the numeral 10, which adaptor unit may be detachably mounted in a flash unit indicated generally by the numeral 12, which flash unit may either be mounted on a conventional camera 14, or otherwise positioned so as to illuminate the object as a picture thereof is being taken.

The flash unit consists generally of a casing 16, commonly of a circular cross section, and having an end wall 18 formed integrally therewith. Any suitable means is provided for detachably securing a flash bulb 20 to the casing, such as the reentrant sleeve 22 shown in the drawings as being formed integrally with the end wall 18. A suitable reflector 24 may be mounted on the flash unit, as by the standard 26 and the band 28. The band 28 is secured to the casing 16, in any desired manner, and as is believed readily apparent, the band 28 could consist of a pair of forwardly extending arcuate and resilient strips, which strips would embrace the sides of the casing, to angularly and vertically adjustably retain the reflector 24 thereon.

The casing 16 is provided with a transverse bore 30 in one wall thereof. A guide sleeve 32 having an outwardly extending retaining flange 34 thereon is secured, in any desired manner, as by welding the flange 36 which is formed integral with the sleeve 32 to the casing 16 to the band 28 so that the sleeve 32 lies axially of the bore 30. A plunger 38 having a flange 40 secured thereto intermediate the ends thereof is reciprocably mounted within the bore 30, and is slidably received by the flange 34 on the sleeve 32. It is intended that the inner diameter of the sleeve 32 be greater than that of the bore 30, so that the casing 16 forms a retaining flange 42 adjacent the bore 30. A spring 44 is interposed between the flange 40 on the plunger 38, and the flange 42 so as to resiliently urge the plunger to its inoperative position.

It is intended that the plunger be electrically connected to the sleeve 22, and for this purpose the casing 16 may be formed of an electrically conducting material. The plunger 38 which is also of preferably electrically conducting material is thus in sliding contact with the casing 16.

The adaptor unit 10 consists generally of a core 46 which conforms to the dimensions of the interior of the casing 16, which core, for reasons which will later become apparent as the following description proceeds, is provided with a longitudinally extending bore 48 which is preferably formed axially of the core 46. A contact terminal which may conveniently consist of a pin 50 having a head 52 is snugly received within one end of the bore 48, the head 52 having a resilient U-shaped arm 54 attached thereto which arm underlies the center contact point of the flash bulb 20.

The core 46 has a recess 56 in that portion which lies adjacent the switch plunger 38, and a contact plate 58 is mounted in said recess so as to be engaged by the plunger 38 as the latter is selectively reciprocated into and out of its operative position. The plate 58 may be provided with suitable detents 60 at the ends thereof, which detents are adapted to be embedded in the material of the core 46 to firmly retain the plate 58 in contact therewith. A transversely extending bore 62 is formed in the core 46, and communicates the longitudinally extending bore 48 with the plate member 58. Suitable conductors 64 and 66 are respectively electrically connected to the plate 58 and the contact pin 50, which conductors extend through the bore 48. In order to facilitate the construction of the device, it is apparent that the bore 62 may be suitably dimensioned so as to permit the conductor 64 to be easily extended therethrough.

The core 46 is detachably locked to the casing 16, as by a pin 68 which extends through the aligned bores 70 in the casing and in the core. In this manner it will be readily seen that the locking pin 68 also serves to properly align the plate 58 with the switch plunger 38.

The conductors 64 and 66 are otherwise connected, as by the male plug 72 and the corresponding female plug 74 to a suitable power pack 76.

It will thus be seen that there is provided an adaptor unit for a camera flash unit, which adaptor unit may be utilized in the event that the conventional power pack for the flash unit is not obtainable, and only power packs, such as 76, of a shape and size which would not conform to the inside of the casing 16, can be purchased. Further, the adaptor unit may be utilized where it is desired to use a power pack having a longer life than would be obtainable by a power pack which would be sufficiently small to be positioned within the casing 16. It is further believed readily apparent that this adaptor unit can be utilized without any way impairing the use of the power pack in its conventional manner wherein the batteries are contained within the casing 16.

From the foregoing, it is thought that the construction and operation of the device will be readily understood, and further discussion is believed to be unnecessary. However, since numerous modifications will readily occur to those skilled in the art after a consideration of the foregoing specification, it is not intended to limit the invention to that shown and described, but all suitable modifications may be resorted to falling within the scope of the appended claims.

Having described the invention, what is claimed as new is:

1. For use in a camera flash unit having a tubular casing adapted to contain a power pack for operating a flash bulb mounted on said casing, a power pack adapter comprising a core conforming to the inner dimensions of the casing, said core having a longitudinal bore therein, a pair of insulated conductors mounted in said bore and extending from said casing, a pin snugly received in the inner end of said bore, one of said conductors being electrically connected to said pin, a resilient U-shaped arm attached to said pin, said core having a longitudinal recess in the outer surface thereof intermediate the ends thereof, a transverse passage connecting said recess, a contact plate mounted in said recess, the other of said conductors being electrically connected to said plate, said core having a second transverse bore spaced from said longitudinal bore, a lock pin mounted in said second transverse bore, said lock pin anchoring said adapter in said casing.

2. A camera flash unit comprising a tubular casing, an end wall at one end of the casing, a flash bulb mounting sleeve secured to said end wall, said casing having a lateral opening therein, a switch element operable through said opening, said switch element being electrically connected to said sleeve, a power pack adapter including a core conforming to the inner dimensions of the casing, said core having a longitudinal bore therein, a pair of insulated conductors mounted in said bore and extending from said casing, a pin snugly received in the inner end of said bore, one of said conductors being electrically connected to said pin, a resilient U-shaped arm attached to said pin, said core having a longitudinal recess on the outer surface thereof intermediate the ends thereof, a transverse passage communicating with said recess, a contact plate mounted in said recess, the other of said conductors being electrically connected to said plate, said contact plate being in register with said opening in said casing whereby said switch element contacts said plate, said core having a second transverse bore spaced from said longitudinal bore, a lock pin mounted in said second transverse bore, said lock pin anchoring said adapter in said casing.

HENRY C. GREEN.

REFERENCES CITED

The following references are of record in the file of this patent:

UNITED STATES PATENTS

| Number | Name | Date |
|---|---|---|
| 1,997,315 | Schwartz | Apr. 9, 1935 |
| 2,293,660 | Nicholas | Aug. 18, 1942 |
| 2,302,031 | Jacobson | Nov. 17, 1942 |
| 2,494,956 | Mendelsohn | Jan. 17, 1950 |